(12) United States Patent
Sloan

(10) Patent No.: US 8,737,730 B2
(45) Date of Patent: May 27, 2014

(54) VECTOR-BASED COLOR DIFFERENCE METRIC FOR COLOR MAPPING

(75) Inventor: Rocklin James Sloan, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 12/763,167

(22) Filed: Apr. 19, 2010

(65) Prior Publication Data

US 2011/0255779 A1 Oct. 20, 2011

(51) Int. Cl.
*G06K 9/00* (2006.01)

(52) U.S. Cl.
USPC ............ 382/167; 382/190; 345/582; 358/1.9; 358/520

(58) Field of Classification Search
USPC ............ 382/162, 167, 190; 345/582; 358/1.9, 358/520
See application file for complete search history.

(56) References Cited

U.S. PATENT DOCUMENTS

| | | | |
|---|---|---|---|
| 6,198,843 B1 | 3/2001 | Nakauchi et al. | |
| 6,469,804 B1 | 10/2002 | Ott et al. | |
| 6,813,390 B2 | 11/2004 | Ali | |
| 6,819,458 B1 | 11/2004 | Tanaka et al. | |
| 6,894,806 B1 | 5/2005 | Woolfe et al. | |
| 6,950,109 B2 | 9/2005 | Deering | |
| 6,954,287 B1 | 10/2005 | Balasubramanian et al. | |
| 7,376,258 B2 | 5/2008 | Klein et al. | |
| 2003/0034983 A1 | 2/2003 | Muramoto | |
| 2006/0103861 A1 * | 5/2006 | Klassen et al. | 358/1.9 |
| 2007/0019873 A1 | 1/2007 | Tzannes et al. | |
| 2008/0136834 A1 | 6/2008 | Zhang et al. | |
| 2008/0174798 A1 * | 7/2008 | Cho et al. | 358/1.9 |
| 2009/0161951 A1 * | 6/2009 | Chien et al. | 382/167 |
| 2010/0272355 A1 * | 10/2010 | Monga et al. | 382/167 |

OTHER PUBLICATIONS

Bonnier, et al., "Evaluation of Spatial Gamut Mapping Algorithms", 2006. (Fourteenth Color Imaging Conference:Color Science and Engineering System, Technologies, Applications) Scottsdale, Arizona; Nov. 2006.
Morovic J. and Luo M.R., "The Fundamentals of Gamut Mapping: A Survey", Journal of Imaging Science and Technology, Jul. 2000.
U.S. Appl. No. 12/474,272, filed May 28, 2009, Rocklin Sloan.

* cited by examiner

*Primary Examiner* — Chan Park
*Assistant Examiner* — Eueng-Nan Yeh
(74) *Attorney, Agent, or Firm* — Fitzpatrick, Cella, Harper & Scinto

(57) ABSTRACT

Color management using a vector-based color difference metric. A color difference map is comprised of color difference vectors for each of a plurality of pixels of an original image. The color difference vector for each pixel includes both a magnitude and a directionality representing a difference for color data in each pixel in the original image, relative to color data in a corresponding mapped pixel in a color mapped image. Pixels in the color difference map having large color differences in color movement relative to nearby pixels are identified in the color difference map, by applying an edge-detection algorithm to the color difference map. For each pixel that is identified in a smooth area in the original image and is identified as having a large color difference in the color difference map, a correction algorithm is applied, so as to provide a corrected color mapped image.

32 Claims, 8 Drawing Sheets

PIXELS

M →

↓ N

|   | 1 | 2 | 3 ... | M |
|---|---|---|---|---|
| 1 | (ΔL,Δa,Δb) | (ΔL,Δa,Δb) | (ΔL,Δa,Δb) | (ΔL,Δa,Δb) |
| 2 | (ΔL,Δa,Δb) | (ΔL,Δa,Δb) | (ΔL,Δa,Δb) | (ΔL,Δa,Δb) |
| 3 | (ΔL,Δa,Δb) | (ΔL,Δa,Δb) | (ΔL,Δa,Δb) | (ΔL,Δa,Δb) |
| ⋮ |   |   |   |   |
| N | (ΔL,Δa,Δb) | (ΔL,Δa,Δb) | (ΔL,Δa,Δb) | (ΔL,Δa,Δb) |

COLOR DIFFERENCE MAP

FIG. 7

VECTOR-BASED COLOR DIFFERENCE METRIC FOR COLOR MAPPING

FIELD

The present disclosure relates to color mapping, and more particularly relates to the use of a vector-based color difference metric to improve color mapping.

BACKGROUND

In the field of this disclosure, it is common to use a color difference metric to measure the "color difference" or "color movement" between an original color and a mapped color. For example, a commonly used metric is the deltaE color difference metric, which is evaluated in the Lab 3-D color space. The deltaE metric is the magnitude of the 3-D color distance between the original color and the mapped color (in the 3-D color space).

Given an original color ($L_1$, $a_1$, $b_1$) and a mapped color ($L_2$, $a_2$, $b_2$), the deltaE color distance is the Euclidean distance, or the straight line distance between the two color points in Lab space, as represented by Equation 1:

$$\text{delta}E = \sqrt{(L_1-L_2)^2 + (a_1-a_2)^2 + (b_1-b_2)^2} \quad \text{(Equation 1)}$$

Thus, the deltaE metric represents the magnitude of the 3-D color distance between the original color and the mapped color.

SUMMARY

The inventor herein has encountered difficulty in using conventional color difference metrics that represent only the magnitude of the color difference to evaluate color mappings.

In particular, when used to evaluate color mappings of pixels of an original image, such a conventional color difference metric might lead to an incorrect inference that colors of two pixels of the original image have been mapped similarly, in situations where the deltaE metrics for each are similar to each other. In practice, however, it is found that even if the deltaE metric for the two pixels are similar to each other, the mappings for the colors might actually be quite different.

For example, color mappings might have moved the colors of the two pixels in opposite directions, resulting in a large color difference between the colors of the two pixels in the color mapped image, even if the deltaE color difference metric is the same for both mappings.

The foregoing situation is addressed through the use of color difference vectors as a color difference metric to evaluate color mappings. In particular, each color difference vector includes both a magnitude and a directionality representing a difference for color data.

Thus, in an example embodiment described herein, an original image represented as an array of a plurality of pixels is transformed using a color mapping algorithm to generate a color mapped image. Pixels in smooth areas in the original image are identified by applying an edge-detection algorithm that detects pixels in edge areas and pixels in smooth areas of the original image. A color difference map is generated between the color mapped image and the original image. The color difference map is comprised of color difference vectors for each of the plurality of pixels of the original image. The color difference vector for each pixel includes both a magnitude and a directionality representing a difference for color data in each pixel in the original image, relative to color data in a corresponding mapped pixel in the color mapped image. Pixels in the color difference map having large color differences in color movement relative to nearby pixels are identified in the color difference map, by applying an edge-detection algorithm to the color difference map to identify edge areas of the color difference map for which pixels in the color difference map have large differences of color movement relative to nearby pixels, and smooth areas of the color difference map for which pixels do not have large differences of color movement relative to nearby pixels. For each pixel that is identified in a smooth area in the original image and is identified as having a large color difference in the color difference map, a correction algorithm is applied, so as to provide a corrected color mapped image.

In one advantage, it is possible to correct a color mapped image so as to ensure that colors of smooth areas in an original image are mapped similarly, so as to preserve the smooth area in the color mapped image and reduce image irregularities, such as contouring or other artifacts. As an example, in smooth areas where colors are similar, an end user would expect all such colors to map similarly. By examining the color difference vectors in both magnitude and direction, it is possible to determine whether all colors in a smooth area in an original image are mapped similarly. In a case where all colors in a smooth area are not mapped similarly, color correction can be performed so as to preserve the smooth area in the color mapped image.

In an example embodiment described herein, during the identification of the large color difference areas, the directionality included in the color difference vectors of the color difference map is used to identify pixels having large differences in color movement even if the magnitude of the color difference vectors is similar.

In an example embodiment described herein, a gradient is determined for each pixel. The gradient indicates whether the color movement magnitude and directionality of the pixel correspond to the color movement magnitude and directionality of nearby pixels of a similar color. A color difference gradient map that includes the determined gradients is generated. The gradients in the color difference gradient map are modified to reduce suspected artifacts. The color difference map is re-calculated based on the modified gradients in the color difference gradient map. Pixels having a large color difference in the re-calculated color difference map are identified. For each pixel that is identified in a smooth area in the original image and is identified as having a large color difference in the re-calculated color difference map, a correction algorithm is applied to the corrected color mapped image, so as to provide the corrected color mapped image.

In an example embodiment described herein, the gradients in the color difference gradient map are modified to reduce artifacts by applying the color correction algorithm, and the color difference map is re-calculated based on the modified gradients in the color difference gradient map. The colors in the color mapped image are re-calculated, based on the color difference vectors in the re-calculated color difference map, so as to provide the corrected color mapped image.

In an example embodiment described herein, an iterative process is performed repeatedly in which a new color difference map is generated between the corrected color mapped image and the original image, regions in the new color difference map having large color differences are identified, and the correction algorithm is applied to the corrected color mapped image. A determination is made as to whether a predetermined quality condition is satisfied, and the iterative process is performed repeatedly until the quality condition is satisfied.

In an example embodiment also described herein, the color mapping algorithm is a gamut mapping algorithm (GMA).

In an example embodiment also described herein, the correction algorithm is applied to the color mapped image, so as to provide the corrected color mapped image.

In an example embodiment also described herein, the correction algorithm adjusts the color mapping algorithm, and the original image is transformed using the adjusted color mapping algorithm, so as to provide the corrected color mapped image.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 7 is a conceptual illustration of a color difference map for an original image according to an example embodiment.

DETAILED DESCRIPTION

Figure 1:
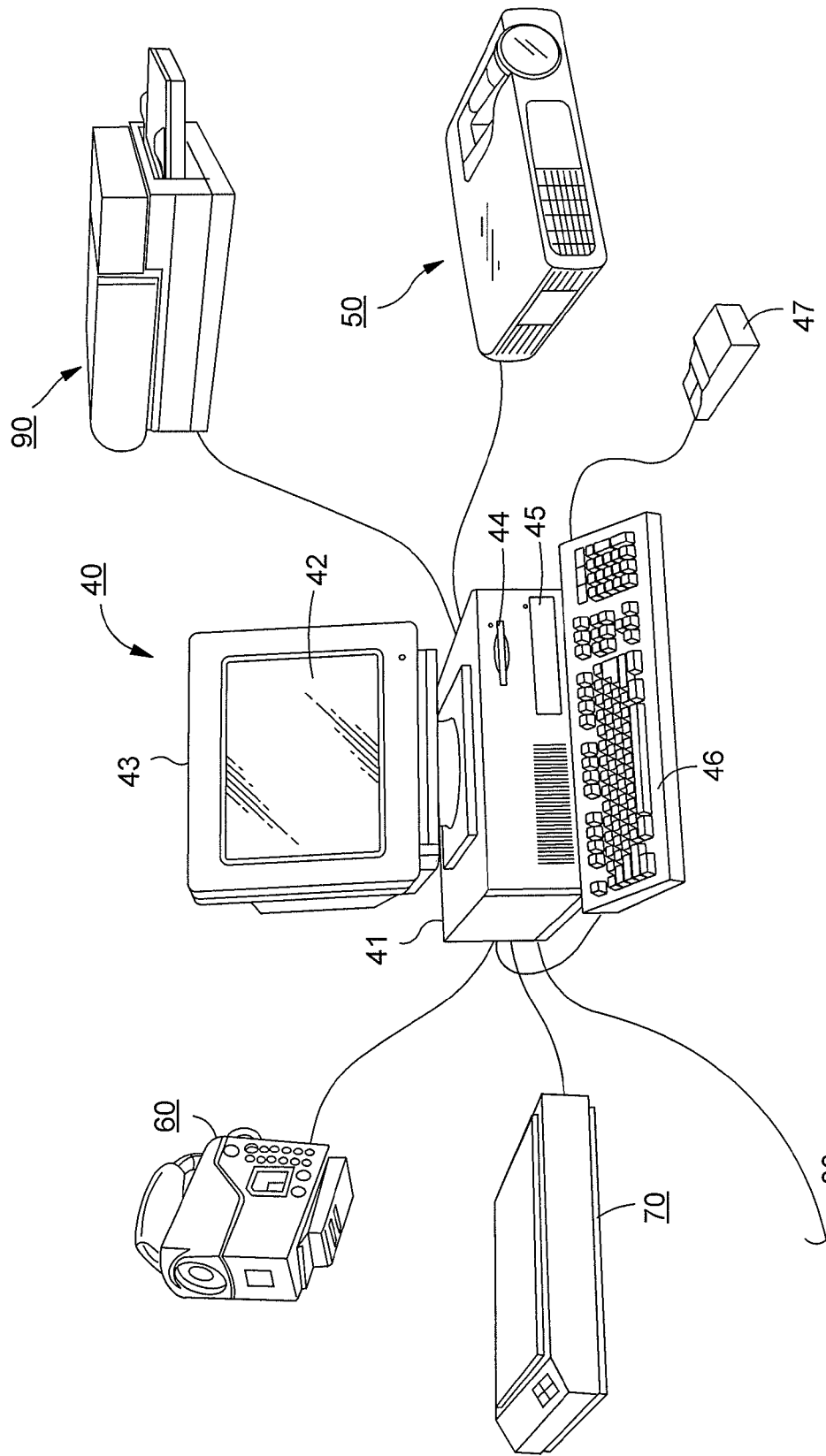
FIG. 1 is a representative view of computing equipment relevant to one example embodiment.

FIG. 1 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Projector 50 is a first example of a color output device, and in this example is an RGB or RGBW projector, such as a DLP™ digital projector or other display device that projects images in accordance with image data from host computer 41 onto a projection screen (not shown). Project 50 may be an HDR device capable of projecting HDR images. Projector 50 projects images onto a display screen (not shown) by using additive light combinations of red (R), green (G) and blue (B) colorant lights. In addition, and particularly in a case of an HDR device, projector 50 also uses a white (W) light so as to increase the brightness/luminance of projected images and thereby project HDR images with good fidelity over a large dynamic range.

Printer 90 is a second example of a color output device, and in this example is a color laser printer which forms color images on a recording medium such as paper or transparencies or the like. Printer 50 forms color images using cyan, magenta, yellow and black colorants, although printers and other devices can be used which form color images using other colorant combinations that might or might not include black, such as a CMYKOG device.

Digital color scanner 70 is a first example of a color input device, and is provided for scanning documents and images and sending the corresponding image data to host computer 41.

Digital color camera 60 a second example of a color input device, and is provided for sending digital image data to host computer 41.

Of course, host computer 41 may acquire digital image data from other sources such as a digital video camera, a local area network or the Internet via network interface 80. Likewise, host computer 41 may interface with other color output devices, such as color output devices accessible over network interface 80.

Figure 2:
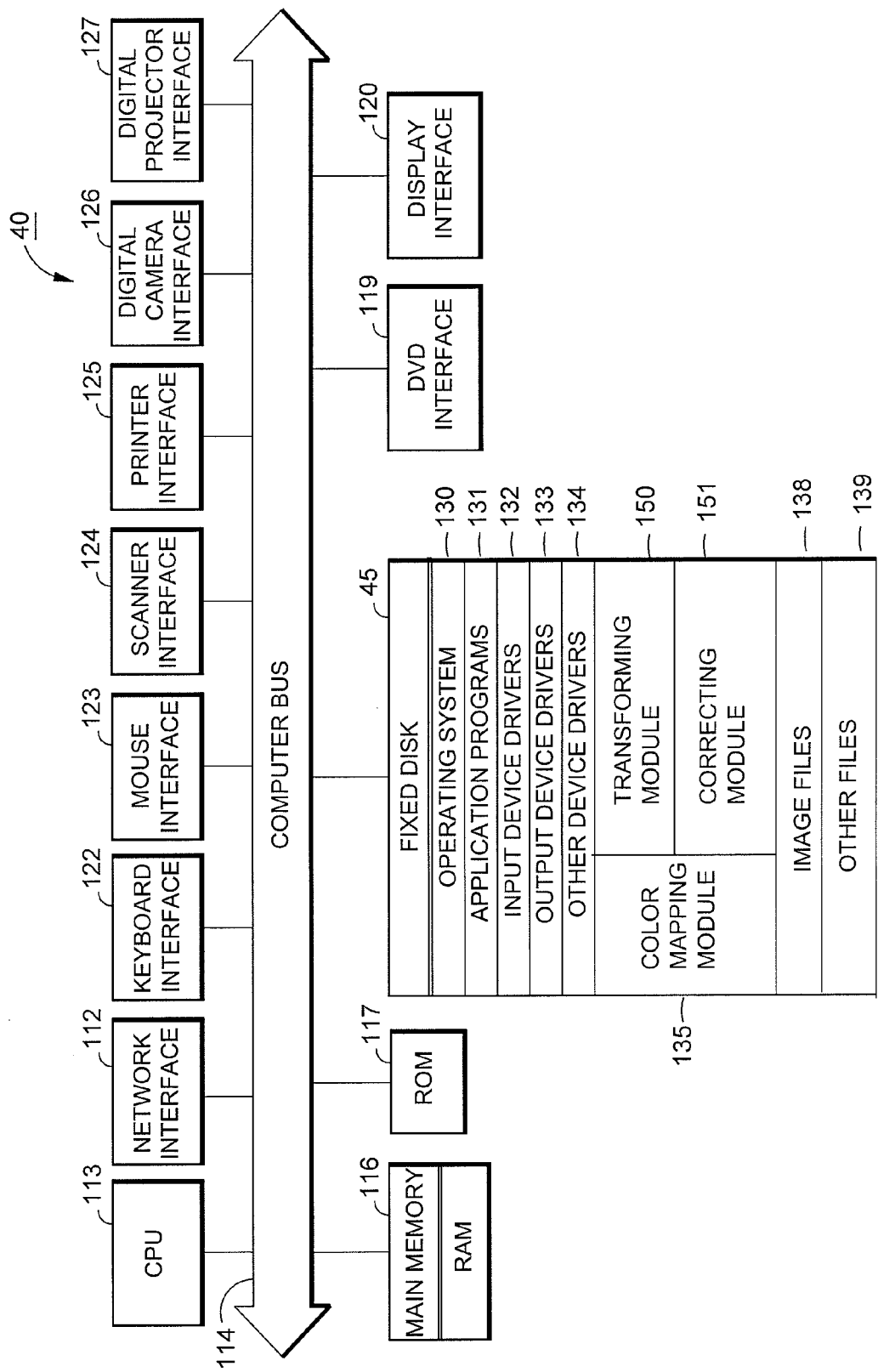
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which interfaces with computer bus 114. Also interfacing with computer bus 114 are hard disk 45, network interface 109, random access memory (RAM) 116 for use as a main run-time transient memory, read only memory (ROM) 117, DVD disk interface 119, display interface 120 for monitor 43, keyboard interface 122 for keyboard 46, mouse interface 123 for pointing device 47, scanner interface 124 for scanner 70, printer interface 125 for printer 90, digital camera interface 126 for digital camera 60, and digital projector interface 127 for digital projector 50.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, hard disk 45 contains computer-executable process steps for operating system 130, and application programs 131, such as word processing programs or a graphic image management programs. Hard disk 45 also contains computer-executable process steps for device drivers for software interface to devices, such as input device drivers 132, output device drivers 133, and other device drivers 134. Image files 138, including color image files, and other files 139 are available for output to color output devices and for manipulation by application programs.

Color mapping module (CMM) 135 comprises computer-executable process steps executed by a computer for performing color mapping of an original image represented as an array of a plurality of pixels. CMM 135 generally comprises computer-executable process steps for a transforming module 150, and computer-executable process steps for a correction module 151. Transforming module 150 transforms the original image using a color mapping algorithm to generate a color mapped image. Correction module 151 identifies pixels in smooth areas in the original image by applying an edge-detection algorithm that detects pixels in edge areas and pixels in smooth areas of the original image. Correction module 151 generates a color difference map between the color mapped image and the original image. The color difference map is comprised of color difference vectors for each of the plurality of pixels of the original image. The color difference vector for each pixel includes both a magnitude and a directionality representing a difference for color data in each pixel in the original image, relative to color data in a corresponding mapped pixel in the color mapped image. Correction module 151 identifies pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels, and smooth areas of the color difference map for which pixels do not have large differences of color movement relative to nearby pixels. For each pixel that is identified in a smooth area in the original image and is identified as having a large color difference in the color difference map, correction module 151 applies a correction algorithm, so as to provide a corrected color mapped image.

The computer-executable process steps for CMM 135 may be configured as a part of operating system 130, as part of an output device driver such as a printer driver, or as a stand-alone application program such as a color management system. They may also be configured as a plug-in or dynamic link library (DLL) to the operating system, device driver or application program. For example, CMM 135 according to example embodiments may be incorporated in an output device driver for execution in a computing device, such as a printer driver, embedded in the firmware of an output device, such as a printer, or provided in a stand-alone color management application for use on a general purpose computer. In one example embodiment described herein, CMM 135 is incorporated directly into the operating system for general purpose host computer 41. It can be appreciated that the present disclosure is not limited to these embodiments and that the disclosed color management module may be used in other environments in which color management is used.

Figure 3:
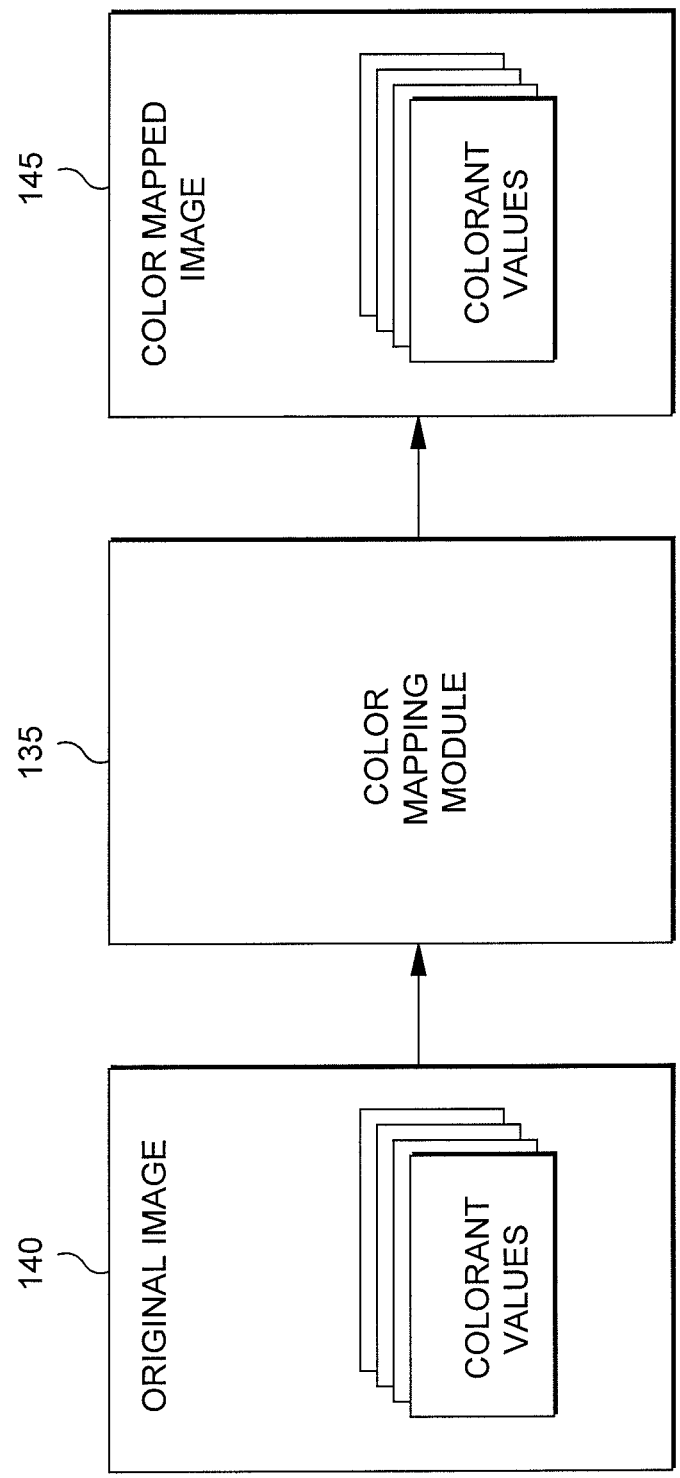
FIG. 3 shows a representational view of color mapping performed by a color mapping module according to an example embodiment.

FIG. 3 shows a representational view of color mapping performed by a color mapping module. As explained hereinabove, a original color image 140 contains colorant values in a source color space. The source color space can be a device dependent color space, such as, for example, an RGB color space for a scanner or camera or LCD display, or it can be a device independent color space, such as, for example, a Lab color space, a CIEXYZ color space, a CIECAM02 JCh color space, or the like. CMM 135 is applied to the source colorant values in the original image 140 so as to obtain a counterpart color mapped image 145 for a destination color space. Because of the effect of processing by CMM 135, the color mapped image 145 exhibits good color fidelity relative to the original color image 140, despite a change from the source color space to the destination color space, and despite other changes such as changes in viewing conditions and output media. Color mapped image 145 contains colorant values in the destination color space. The destination color space can be a device dependent color space, such as, for example, a CMYK color space for a color laser printer, or it can be a device independent color space, such as, for example, a Lab color space, a CIEXYZ color space, a CIECAM02 JCh color space, or the like.

In use of CMM 135, nearly any device can serve as the source device in the case where the source color space is a device color space, and nearly any device can serve as the destination, in a case where the destination color space is a device color space. In one example, the source device might be digital camera 60 which captures an image of a natural scene, and the destination device might be color laser printer 90 which produces a printout of the captured image. In another example, the source device might be display 43 which is displaying a color image, and the destination device might be projector 90 for which it is desired to project a counterpart color image with good fidelity to the image being displayed by the display 43. In further examples of use of CMM 135, projector 50 can operate either as a source device or as a destination device. One example of projector 50 operating as a source device is in a situation where it is desired to print an image on printer 90 in correspondence to an image being projected by projector 50. One example of projector 50 operating as a destination device is a situation where it is desired to project an image corresponding to an image captured by digital camera 60. Other examples are situations where it is desired to project an image in correspondence to an image scanned by scanner 70, or displayed by display 43 on screen 42. Other combinations and permutations are possible and will be evident to those of ordinary skill in the art.

Figure 4:
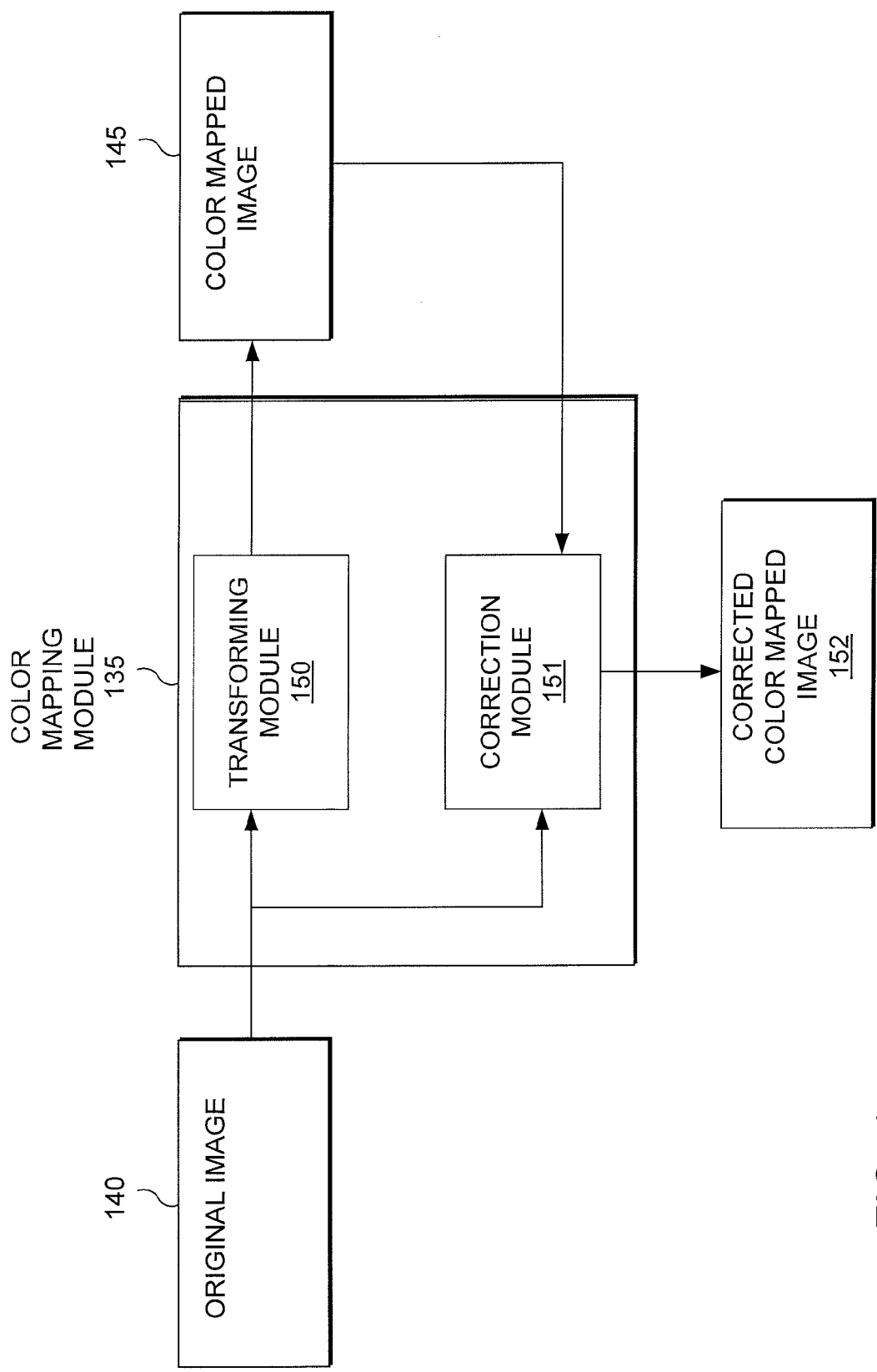
FIG. 4 is a view for explaining software architecture of a color mapping module according to an example embodiment.

FIG. 4 is a view for explaining software architecture of color mapping module 135 according to an example embodiment. Color mapping module 135 includes transforming module 150 and correction module 151.

Transforming module 150 receives an original image (e.g., original image 140), and uses a color mapping algorithm to transform the original image into a color mapped image (e.g., color mapped image 145). In the example embodiment, the color mapping algorithm is a gamut mapping algorithm (GMA). However, in other embodiments, the color mapping algorithm can be any other suitable type of color mapping algorithm.

Correction module 151 receives the original image. Correction module 151 also receives the color mapped image generated by transforming module 150. Correction module 151 identifies pixels in smooth areas in the original image by applying an edge-detection algorithm that detects pixels in edge areas and pixels in smooth areas of the original image. Correction module 151 generates a color difference map between the color mapped image and the original image. The color difference map is comprised of color difference vectors for each of the plurality of pixels of the original image. The color difference vector for each pixel includes both a magnitude and a directionality representing a difference for color data in each pixel in the original image, relative to color data in a corresponding mapped pixel in the color mapped image. Correction module 151 identifies pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels, and smooth areas of the color difference map for which pixels do not have large differences of color movement relative to nearby pixels. For each pixel that is identified in a smooth area in the original image and is identified as having a large color difference in the color difference map, correction module 151 applies a correction algorithm, so as to provide a corrected color mapped image 152.

During the identification of the large color difference areas, correction module 151 uses the directionality included in the color difference vectors of the color difference map to identify pixels having large differences in color movement even if the magnitude of the color difference vectors is similar.

Figure 5:
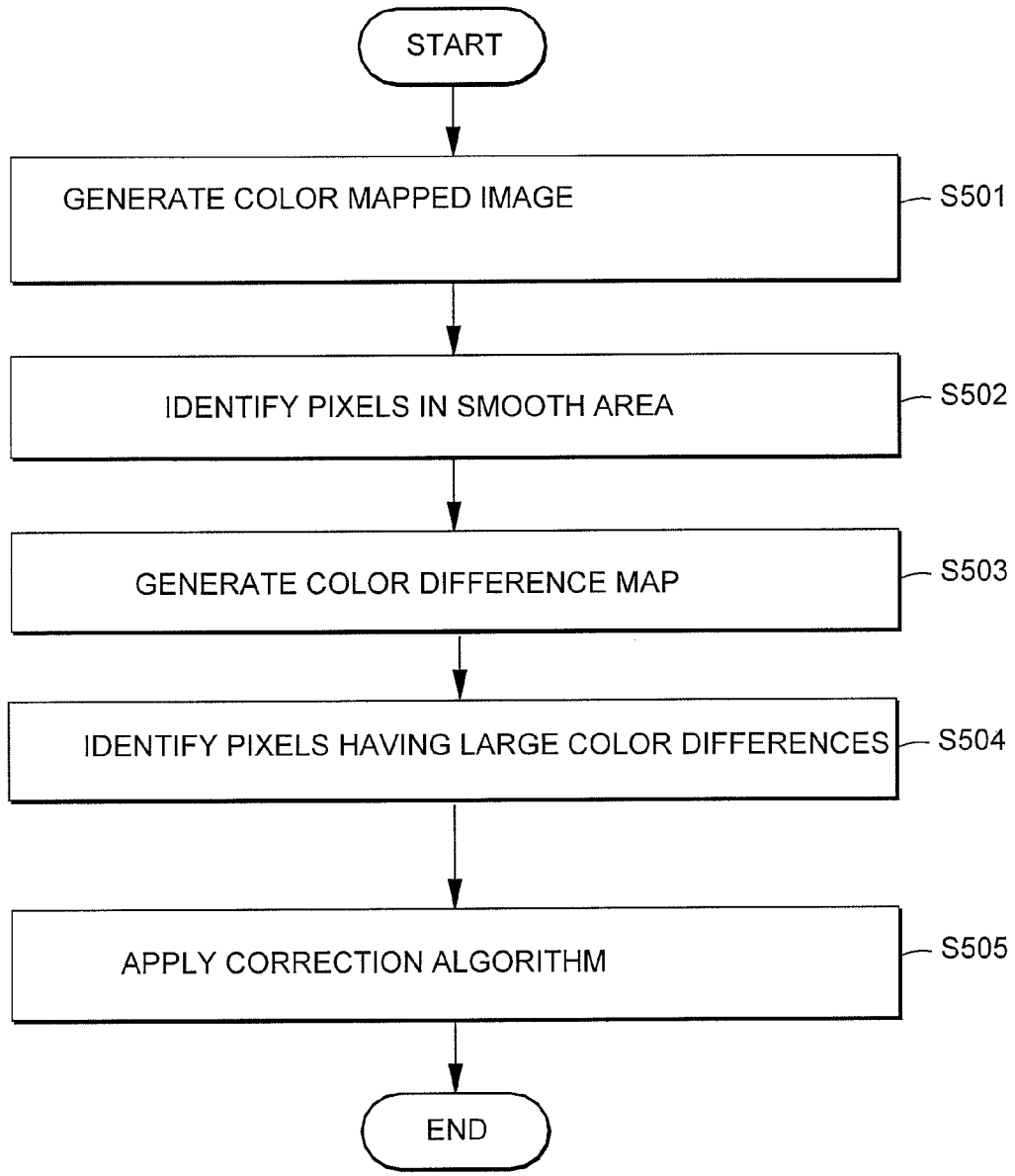
FIG. 5 is a flow diagram for explaining color processing in a color mapping module according to an example embodiment

FIG. 5 is a flow diagram for explaining color processing in a color mapping module according to an example embodiment. At step S501, transforming module 150 uses the color mapping algorithm to transform the original image 140 to generate the color mapped image 145.

At step S502, correction module 151 receives original image 140 and identifies pixels in smooth area of the original image by applying an edge-detection algorithm that detects pixels in edge areas and pixels in smooth areas of the original image. In particular, the edge-detection algorithm is applied to the original image to get an "original image edge map". The original image edge map has an "edge" value corresponding to each pixel in the original image. The higher the "edge" value for a pixel, the more likely an "edge" (i.e., a large color transition) occurs in the corresponding area of the image. An edge threshold value is chosen, an areas of the original image edge map that are below this threshold are classified as "smooth". In the example embodiment, the edge threshold depends on the color mapping algorithm and the edge-detection algorithm.

Figure 6:
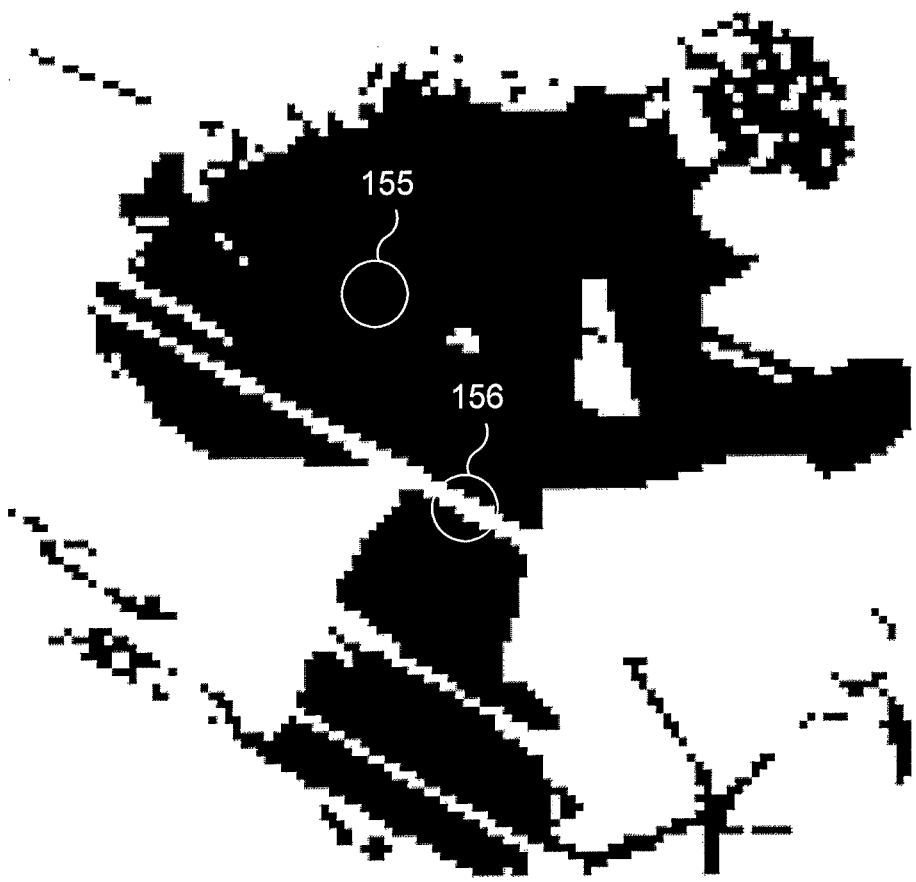
FIG. 6 depicts an edge map for an example original image according to an example embodiment.

FIG. 6 depicts an edge map for an example original image. As shown in FIG. 6, reference 155 identifies a "smooth" area in which pixels have similar colors, and reference 156 identifies an "edge" area, in which pixels have differing colors.

At step S503, correction module 151 generates a color difference map between the received color mapped image and the received original image. The color difference map is comprised of color difference vectors for each of the plurality of pixels of the original image. The color difference vector for each pixel includes both a magnitude and a directionality representing a difference for color data in each pixel in the original image, relative to color data in a corresponding mapped pixel in the color mapped image.

FIG. 7 is a conceptual illustration of a color difference map for an original image having M×N pixels. As shown in FIG. 7, each pixel has a corresponding color difference vector. In the example shown in FIG. 7, the original color image and the color mapped image each contain colorant values in the CIELab color space. Thus, each color difference vector is represented as a 3-tuple including "$\Delta L$", "$\Delta a$", and "$\Delta b$" components, i.e., ($\Delta L$, $\Delta a$, $\Delta b$). For each pixel, the color difference vector ($\Delta L$, $\Delta a$, $\Delta b$) is computed by subtracting the original color point ($L_{orig}$, $a_{orig}$, $b_{orig}$) in the original image from the mapped point ($L_{mapped}$, $a_{mapped}$, $b_{mapped}$) in the color mapped image, as shown in Equation 2:

$$(\Delta L, \Delta a, \Delta b) = (L_{mapped}, a_{mapped}, b_{mapped}) - (L_{orig}, a_{orig}, b_{orig})$$ (Equation 2)

Thus, the color distance vector for each pixel indicates a directionality representing a difference for color data in each pixel in the original image, relative to color data in a corresponding mapped pixel in the color mapped image.

In another example embodiments, the color distance vector is represented in cylindrical coordinates. In such a cylindrical coordinate vector, the lightness axis "L" is linear (as in a Cartesian coordinate system), but the "a" and "b" correlates are represented in polar coordinates (i.e., in angle and magnitude). In another example embodiments, the color distance vector is represented in spherical coordinates. In such a spherical coordinate vector, the distance is represented by a pair of angles and a magnitude. The magnitude is the Euclidean distance.

Additionally, the vector can be used to calculate a magnitude representing a difference for color data in each pixel in the original image, relative to color data in a corresponding mapped pixel in the color mapped image. For example, for a vector ($\Delta L$, $\Delta a$, $\Delta b$), the magnitude is the square root of $(\Delta L)^2 + (\Delta a)^2 + \Delta(b)^2$.

At step S504, correction module 151 identifies pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels, and smooth areas of the color difference map for which pixels do not have large differences of color movement relative to nearby pixels.

In the example embodiment, the edge detection algorithm is different from the edge detection algorithm used in step S502, but in other embodiments, the same edge detection algorithm can be used to detect smooth areas, and to identify pixels in the color difference map having large color differences in color movement relative to nearby pixels in the color difference map.

In particular, in the example embodiment, correction module 151 breaks up the color difference map into L, a, and b component maps, which represent the amount of color movement in each of the component directions. The edge-detection algorithm is applied to each of the component maps to find areas (i.e., edges) where the color movement changes rapidly. The component edge maps are then combined by adding. In other embodiments, component edge maps are then combined using Euclidean distance, or any other suitable type of technique.

The resultant combined movement edge map indicates the amount of movement directional changes in various parts of the original image. A threshold value is chosen, and pixels in this combined movement edge map that are above the threshold are classified as pixels where the magnitude and direction of color movement changes greatly, as compared to nearby pixels.

At step S505, correction module 151 identifies pixels that are both classified as "smooth" and classified as having a large color difference in color movement relative to nearby pixels in the color difference map, as determined in steps S502 and S504, respectively. In the example embodiment, for each pixel that is both classified as "smooth" and classified as having a large color difference in color movement relative to nearby pixels in the color difference map, correction module 151 directly applies the correction algorithm to the pixel in the color mapped image, so as to provide the corrected color mapped image.

In another example embodiment, for each pixel that is both classified as "smooth" and classified as having a large color difference in color movement relative to nearby pixels in the color difference map, correction module 151 indirectly applies the color correction algorithm to the pixel in the color mapped image. In particular, correction module 151 applies the color correction algorithm to the color mapping algorithm used by transforming module 150, so as to adjust the color mapping algorithm. Transforming module 150 then transforms the original image using the adjusted color mapping algorithm, so as to provide the corrected color mapped image.

In another example embodiment, for each pixel that is both classified as "smooth" and classified as having a large color difference in color movement relative to nearby pixels in the color difference map, correction module 151 performs an iterative process repeatedly in which a new color difference map is generated between the corrected color mapped image and the original image, regions in the new color difference map having large color differences are identified, the correction algorithm is applied to the pixels corrected color mapped image, a determination is made as to whether a predetermined quality condition is satisfied, and the iterative process is performed repeatedly until the quality condition is satisfied.

Figure 8:
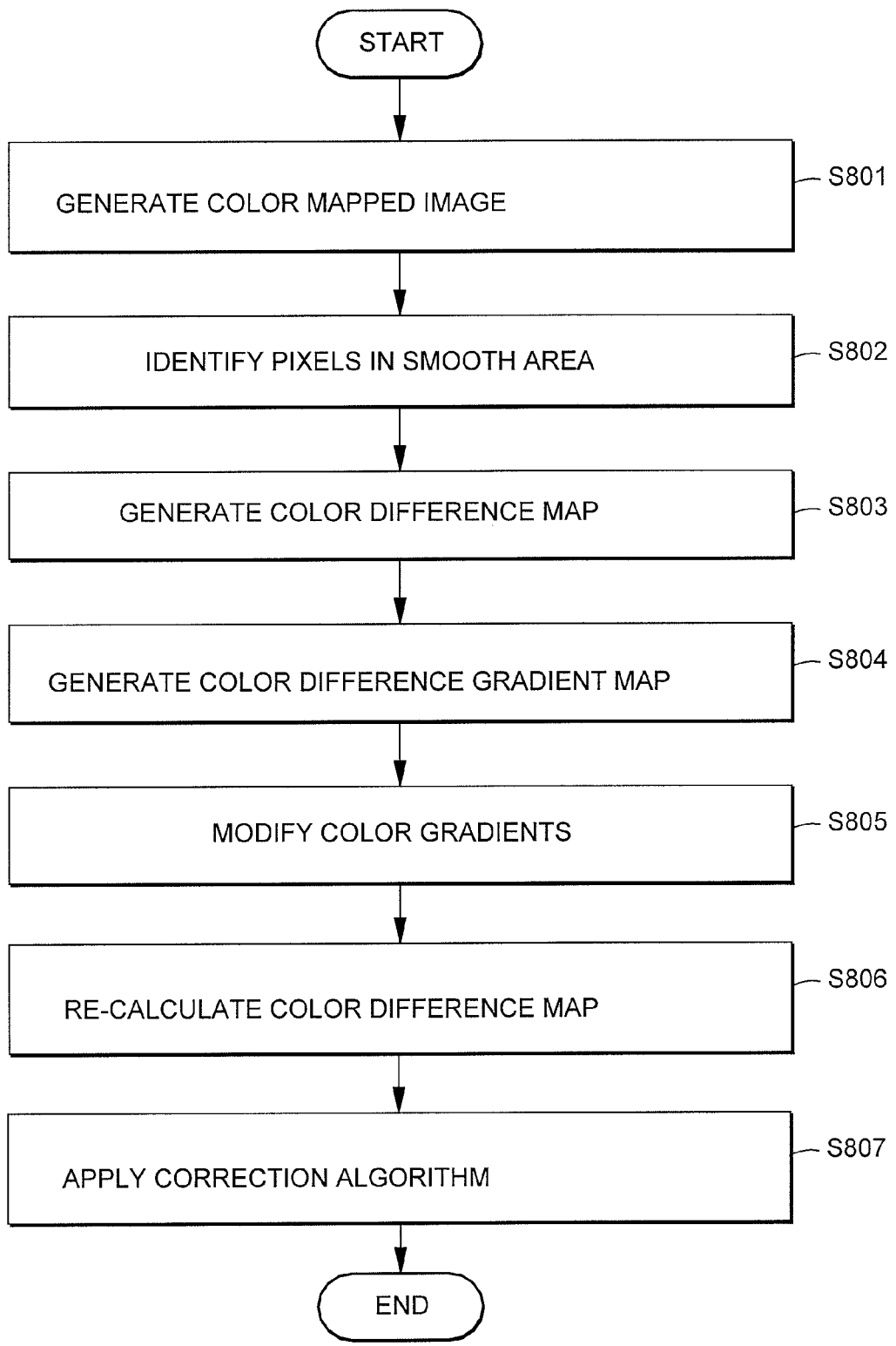
FIG. 8 is a flow diagram for explaining color processing in a color mapping module according to an example embodiment.

FIG. 8 is a flow diagram for explaining color processing in a color mapping module according to an example embodiment in which a color gradients are used to provide a corrected color mapped image.

At step S801, a transforming module (e.g., 150) uses a color mapping algorithm to transform the original image (e.g., 140) to generate the color mapped image (e.g. 145).

At step S802, a correction module (e.g., 151) receives the original image and identifies pixels in smooth area of the original image by applying an edge-detection algorithm, in a manner similar to that described above for step S502 of FIG. 5.

At step S803 the color correction module generates a color difference map between the received color mapped image and the received original image, in a manner similar to that described above for step S504 of FIG. 3.

At step S804, the color correction module examines each pixel to determine whether the color movement and direction of the pixel (as identified in the color difference map) correspond to the color movement and direction of nearby pixels of a similar color. In particular, for each smooth area identified in step S802, each pixel is examined to determine whether the color movement and direction of the pixel correspond to the color movement and direction of other pixels in the smooth area. For each pixel, result of this determination is a color gradient that indicates whether the color movement magnitude directionality of the pixel correspond to the color magnitude and directionality of nearby pixels of a similar color. The color correction module generates a color difference gradient map that includes the determined color gradients for each pixel.

At step S805, the color correction module modifies the color gradients in the color difference gradient map to reduce suspected artifacts.

At step S806, the color correction module re-calculates the color difference map generated at step S803 based on the modified gradients in the color difference gradient map.

At step S807, the color correction module identifies pixels having a large color difference in the re-calculated color difference map. For each pixel that is identified in a smooth area in the original image and is identified as having a large color difference in the re-calculated color difference map, the correction module applies a correction algorithm to the color mapped image, so as to provide the corrected color mapped image.

In another example embodiment, rather than applying the color correction algorithm to the color mapped image, the color difference gradient map is generated a described above for step S804, and the correction module modifies the gradients in the color difference gradient map to reduce artifacts by applying the color correction algorithm. The correction module re-calculates the color difference map based on the modified gradients in the color difference gradient map. The colors in the color mapped image are then re-calculated, based on the color difference vectors in the re-calculated color difference map, so as to provide the corrected color mapped image.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of performing image color mapping of an original image represented as an array of a plurality of pixels, the method comprising:
   transforming the original image using a color mapping algorithm to generate a color mapped image;
   identifying pixels in smooth areas in the original image by applying an edge-detection algorithm that detects pixels in smooth areas of the original image;
   generating a color difference map between the color mapped image and the original image, wherein the color difference map is comprised of color difference vectors for each of the plurality of pixels of the original image, wherein the color difference vector for each pixel includes both a magnitude and a directionality representing a difference for color data in each pixel in the original image, relative to color data in a corresponding mapped pixel in the color mapped image;
   identifying pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels; and
   for each pixel that is identified in a smooth area in the original image and is identified as having a large color difference in the color difference map, applying a correction algorithm, so as to provide a corrected color mapped image.

2. The method of claim 1, wherein during the identification of the large color difference areas, the directionality included in the color difference vectors of the color difference map is used to identify pixels having large differences in color movement even if the magnitude of the color difference vectors is similar.

3. The method of claim 1, further comprising:
   determining a gradient for each pixel, the gradient indicating whether the color movement magnitude and directionality of the pixel correspond to the color movement magnitude and directionality of nearby pixels of a similar color;
   generating a color difference gradient map that includes the determined gradients;
   modifying the gradients in the color difference gradient map to reduce suspected artifacts;
   re-calculating the color difference map based on the modified gradients in the color difference gradient map;
   identifying pixels having a large color difference in the re-calculated color difference map; and
   for each pixel that is identified in a smooth area in the original image and is identified as having a large color difference in the re-calculated color difference map, applying a correction algorithm to the color mapped image, so as to provide the corrected color mapped image.

4. The method of claim 1, further comprising:
   determining a gradient for each pixel, the gradient indicating whether the color movement magnitude and directionality of the pixel correspond to the color movement magnitude and directionality of nearby pixels of a similar color;

generating a color difference gradient map that includes the determined gradients;

modifying the gradients in the color difference gradient map to reduce artifacts by applying the color correction algorithm;

re-calculating the color difference map based on the modified gradients in the color difference gradient map;

re-calculating the colors in the color mapped image based on the color difference vectors in the re-calculated color difference map, so as to provide the corrected color mapped image.

5. The method of claim 1, wherein an iterative process is performed repeatedly in which a new color difference map is generated between the corrected color mapped image and the original image, regions in the new color difference map having large color differences are identified, the correction algorithm is applied to the corrected color mapped image, a determination is made as to whether a predetermined quality condition is satisfied, and the iterative process is performed repeatedly until the quality condition is satisfied.

6. The method of claim 1, wherein the color mapping algorithm is a gamut mapping algorithm (GMA).

7. The method of claim 1, wherein the correction algorithm is applied to the color mapped image, so as to provide the corrected color mapped image.

8. The method of claim 1, wherein the correction algorithm adjusts the color mapping algorithm, and the original image is transformed using the adjusted color mapping algorithm, so as to provide the corrected color mapped image.

9. A non-transitory computer-readable memory medium on which is stored a computer program for causing a computer to perform image color mapping of an original image represented as an array of a plurality of pixels, the memory medium comprising:

a transforming module constructed to transform the original image using a color mapping algorithm to generate a color mapped image; and a correction module constructed to:

identify pixels in smooth areas in the original image by applying an edge-detection algorithm that detects pixels in smooth areas of the original image;

generate a color difference map between the color mapped image and the original image, wherein the color difference map is comprised of color difference vectors for each of the plurality of pixels of the original image, wherein the color difference vector for each pixel includes both a magnitude and a directionality representing a difference for color data in each pixel in the original image, relative to color data in a corresponding mapped pixel in the color mapped image;

identify pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels; and apply, for each pixel that is identified in a smooth area in the original image and is identified as having a large color difference in the color difference map, a correction algorithm, so as to provide a corrected color mapped image.

10. The memory medium of claim 9, wherein during the identification of the large color difference areas, the directionality included in the color difference vectors of the color difference map is used to identify pixels having large differences in color movement even if the magnitude of the color difference vectors is similar.

11. The memory medium of claim 9, wherein the color correction module is constructed to:

determine a gradient for each pixel, the gradient indicating whether the color movement magnitude and directionality of the pixel correspond to the color movement magnitude and directionality of nearby pixels of a similar color;

generate a color difference gradient map that includes the determined gradients;

modify the gradients in the color difference gradient map to reduce suspected artifacts;

re-calculate the color difference map based on the modified gradients in the color difference gradient map;

identify pixels having a large color difference in the re-calculated color difference map; and for each pixel that is identified in a smooth area in the original image and is identified as having a large color difference in the re-calculated color difference map, apply a correction algorithm to the color mapped image, so as to provide the corrected color mapped image.

12. The memory medium of claim 9, wherein the color correction module is constructed to:

determine a gradient for each pixel, the gradient indicating whether the color movement magnitude and directionality of the pixel correspond to the color movement magnitude and directionality of nearby pixels of a similar color;

generate a color difference gradient map that includes the determined gradients;

modify the gradients in the color difference gradient map to reduce artifacts by applying the color correction algorithm;

re-calculate the color difference map based on the modified gradients in the color difference gradient map;

recalculate the colors in the color mapped image based on the color difference vectors in the re-calculated color difference map, so as to provide the corrected color mapped image.

13. The memory medium of claim 9, wherein an iterative process is performed repeatedly in which a new color difference map is generated between the corrected color mapped image and the original image, regions in the new color difference map having large color differences are identified, the correction algorithm is applied to the corrected color mapped image, a determination is made as to whether a predetermined quality condition is satisfied, and the iterative process is performed repeatedly until the quality condition is satisfied.

14. The memory medium of claim 9, wherein the color mapping algorithm is a gamut mapping algorithm (GMA).

15. The memory medium of claim 9, wherein the correction algorithm is applied to the color mapped image, so as to provide the corrected color mapped image.

16. The memory medium of claim 9, wherein the correction algorithm adjusts the color mapping algorithm, and the original image is transformed using the adjusted color mapping algorithm, so as to provide the corrected color mapped image.

17. A color mapping apparatus comprising:

a computer-readable memory constructed to store computer-executable process steps; and a processor constructed to execute the computer-executable process steps stored in the memory;

wherein the process steps stored in the memory cause the processor to perform image color mapping of an original image represented as an array of a plurality of pixels, and include computer-executable process steps to:

transform the original image using a color mapping algorithm to generate a color mapped image;

identify pixels in smooth areas in the original image by applying an edge-detection algorithm that detects pixels in smooth areas of the original image;

generate a color difference map between the color mapped image and the original image, wherein the color difference map is comprised of color difference vectors for each of the plurality of pixels of the original image, wherein the color difference vector for each pixel includes both a magnitude and a directionality representing a difference for color data in each pixel in the original image, relative to color data in a corresponding mapped pixel in the color mapped image;

identify pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels; and for each pixel that is identified in a smooth area in the original image and is identified as having a large color difference in the color difference map, apply a correction algorithm, so as to provide a corrected color mapped image.

18. The apparatus of claim 17, wherein during the identification of the large color difference areas, the directionality included in the color difference vectors of the color difference map is used to identify pixels having large differences in color movement even if the magnitude of the color difference vectors is similar.

19. The apparatus of claim 17, wherein the computer-executable process steps stored in the memory further include process steps to:

determine a gradient for each pixel, the gradient indicating whether the color movement magnitude and directionality of the pixel correspond to the color movement magnitude and directionality of nearby pixels of a similar color;

generate a color difference gradient map that includes the determined gradients;

modify the gradients in the color difference gradient map to reduce suspected artifacts;

re-calculate the color difference map based on the modified gradients in the color difference gradient map;

identify pixels having a large color difference in the re-calculated color difference map; and for each pixel that is identified in a smooth area in the original image and is identified as having a large color difference in the re-calculated color difference map, apply a correction algorithm to the color mapped image, so as to provide the corrected color mapped image.

20. The apparatus of claim 17, wherein the computer-executable process steps stored in the memory further include process steps to:

determine a gradient for each pixel, the gradient indicating whether the color movement magnitude and directionality of the pixel correspond to the color movement magnitude and directionality of nearby pixels of a similar color;

generate a color difference gradient map that includes the determined gradients;

modify the gradients in the color difference gradient map to reduce artifacts by applying the color correction algorithm;

re-calculate the color difference map based on the modified gradients in the color difference gradient map;

re-calculate the colors in the color mapped image based on the color difference vectors in the re-calculated color difference map, so as to provide the corrected color mapped image.

21. The apparatus of claim 17, wherein an iterative process is performed repeatedly in which a new color difference map is generated between the corrected color mapped image and the original image, regions in the new color difference map having large color differences are identified, the correction algorithm is applied to the corrected color mapped image, a determination is made as to whether a predetermined quality condition is satisfied, and the iterative process is performed repeatedly until the quality condition is satisfied.

22. The apparatus of claim 17, wherein the color mapping algorithm is a gamut mapping algorithm (GMA).

23. The apparatus of claim 17, wherein the correction algorithm is applied to the color mapped image, so as to provide the corrected color mapped image.

24. The apparatus of claim 17, wherein the correction algorithm adjusts the color mapping algorithm, and the original image is transformed using the adjusted color mapping algorithm, so as to provide the corrected color mapped image.

25. A non-transitory computer-readable memory medium on which is stored computer-executable process steps for causing a computer to perform image color mapping of an original image represented as an array of a plurality of pixels, said process steps comprising:

transforming the original image using a color mapping algorithm to generate a color mapped image;

identifying pixels in smooth areas in the original image by applying an edge-detection algorithm that detects pixels in smooth areas of the original image;

generating a color difference map between the color mapped image and the original image, wherein the color difference map is comprised of color difference vectors for each of the plurality of pixels of the original image, wherein the color difference vector for each pixel includes both a magnitude and a directionality representing a difference for color data in each pixel in the original image, relative to color data in a corresponding mapped pixel in the color mapped image;

identifying pixels in the color difference map having large color differences in color movement relative to nearby pixels in the color difference map, by applying an edge-detection algorithm to the color difference map to identify edge areas of the color difference map for which pixels in the color difference map have large differences of color movement relative to nearby pixels; and for each pixel that is identified in a smooth area in the original image and is identified as having a large color difference in the color difference map, applying a correction algorithm, so as to provide a corrected color mapped image.

26. The computer-readable memory medium of claim 25, wherein during the identification of the large color difference areas, the directionality included in the color difference vectors of the color difference map is used to identify pixels having large differences in color movement even if the magnitude of the color difference vectors is similar.

27. The computer-readable memory medium of claim 25, said process steps further comprising:

determining a gradient for each pixel, the gradient indicating whether the color movement magnitude and directionality of the pixel correspond to the color movement magnitude and directionality of nearby pixels of a similar color;
generating a color difference gradient map that includes the determined gradients;
modifying the gradients in the color difference gradient map to reduce suspected artifacts;
re-calculating the color difference map based on the modified gradients in the color difference gradient map;
identifying pixels having a large color difference in the re-calculated color difference map; and
for each pixel that is identified in a smooth area in the original image and is identified as having a large color difference in the re-calculated color difference map, applying a correction algorithm to the color mapped image, so as to provide the corrected color mapped image.

28. The computer-readable memory medium of claim 25, said process steps further comprising:
determining a gradient for each pixel, the gradient indicating whether the color movement magnitude and directionality of the pixel correspond to the color movement magnitude and directionality of nearby pixels of a similar color;
generating a color difference gradient map that includes the determined gradients;
modifying the gradients in the color difference gradient map to reduce artifacts by applying the color correction algorithm;
re-calculating the color difference map based on the modified gradients in the color difference gradient map;
re-calculating the colors in the color mapped image based on the color difference vectors in the re-calculated color difference map, so as to provide the corrected color mapped image.

29. The computer-readable memory medium of claim 25, wherein an iterative process is performed repeatedly in which a new color difference map is generated between the corrected color mapped image and the original image, regions in the new color difference map having large color differences are identified, the correction algorithm is applied to the corrected color mapped image, a determination is made as to whether a predetermined quality condition is satisfied, and the iterative process is performed repeatedly until the quality condition is satisfied.

30. The computer-readable memory medium of claim 25, wherein the color mapping algorithm is a gamut mapping algorithm (GMA).

31. The computer-readable memory medium of claim 25, wherein the correction algorithm is applied to the color mapped image, so as to provide the corrected color mapped image.

32. The computer-readable memory medium of claim 25, wherein the correction algorithm adjusts the color mapping algorithm, and the original image is transformed using the adjusted color mapping algorithm, so as to provide the corrected color mapped image.

* * * * *